(12) United States Patent
Harel

(10) Patent No.: US 7,072,787 B1
(45) Date of Patent: Jul. 4, 2006

(54) METHOD FOR ANALYZING DATA STORAGE SYSTEM TEST DATA

(75) Inventor: Shay Harel, Marlborough, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 10/931,951

(22) Filed: Sep. 1, 2004

(51) Int. Cl.
*G01R 31/00* (2006.01)

(52) U.S. Cl. ............ 702/117; 702/118; 702/121; 709/224

(58) Field of Classification Search ............ 702/117, 702/118, 121; 709/223–225; 324/760; 714/724–725
See application file for complete search history.

(56) References Cited

U.S. PATENT DOCUMENTS

| | | | | |
|---|---|---|---|---|
| 4,800,483 A | * | 1/1989 | Yamamoto et al. | 710/305 |
| 5,121,475 A | * | 6/1992 | Child et al. | 715/507 |
| 5,519,633 A | * | 5/1996 | Chang et al. | 716/19 |
| 6,574,792 B1 | * | 6/2003 | Easton | 717/142 |
| 6,701,003 B1 | * | 3/2004 | Feinstein | 382/147 |
| 6,865,500 B1 | * | 3/2005 | Variyam et al. | 702/117 |
| 2002/0124213 A1 | * | 9/2002 | Ahrens et al. | 714/57 |
| 2002/0147946 A1 | * | 10/2002 | Jaimsomporn et al. | 714/57 |
| 2003/0126195 A1 | * | 7/2003 | Reynolds et al. | 709/203 |
| 2003/0134526 A1 | * | 7/2003 | Cheng et al. | 439/71 |

* cited by examiner

*Primary Examiner*—Marc S. Hoff
*Assistant Examiner*—Phuong Huynh

(57) ABSTRACT

A method for testing each one of the CPUs on each one of the plurality of director printed circuit. Results from such test are collected in a memory of a computer. The results are collected in a predetermined format. The method processes the collected data to present the results of the tests on a display of the computer in a different format. The different format comprises lines of information on the computer display. Each one of the lines of information identifies a corresponding one of the CPUs and indicates whether such corresponding one of the CPUs passed or failed the testing thereof.

4 Claims, 12 Drawing Sheets

FIG. 8

```
%H>GO GIGETST / FLB_DCPU SPAWN TSTLOOP 10000 DMA_BGT SADD_BGT KKCS 7 ADDR 1B0951D00 LEN 10000
%H>TASK START TIME: '00:28:16.81 10-28-03
%H>anath6-4>
%H>--[ id # 00C9 Gigabit Ethernet Utilities & Tests ]
%H>
%H>Gigabit Ethernet Utilities & Tests PASSED.
%H>
%H> TASK DONE
%H>TASK END TIME: '00:29:01.35 10-28-03
%H>GO GIGETST / FLB_DCPU SPAWN TSTLOOP 10000 ADMA_BGT NSIO_BGT KKCS 7 ADDR 1B0961D00 LEN 10000
%H>TASK START TIME: '00:29:01.75 10-28-03
%H>anath6-4>
%H>--[ id # 00C9 Gigabit Ethernet Utilities & Tests ]
%H>Data not appended
%H>T3::appnd_io_lnk() returned errno
%H>num_pckts=10000 last_rcv_cnt=10400 num_pckts_done=10800 num_pckts_to_be_sent=10000
%H>Gig Ethernet Dual cpu Full Loopback test .... FAILED Loop 0
%H>
%H> ERROR: ErrCode: 00C900070A0A000A slot 3 CPU: 11
%H>         ErrTime: '00:29:21.37 10-28-03
%H>         TaskStartTime: '00:29:01.75 10-28-03
%H>         Loop: 1 of 1 Cloop: 0 of 1
%H>         TestDesc: FIGE gigabit ethernet test
%H>         SubDesc: Dual Cpu Synchronous Full Loopback Test
%H>         ErrGroup: FIGE Back Errs group
%H>         ErrDesc: Link cpu failed to complete I/O
%H> ErrDetail:
%H>
%H> * Link cpu failed to complete I/O:
%H> ----------
%H>
%H> * General Gige test information:
%H> ----------
%H>     Inner Loop      : 00000000
%H>     Packet Len      : 000005DC
%H>     Packet Num      : 00000001
%H>     Pckt Tx'd       : 00030000
%H>     Pckt Rx'd       : 00010800
%H>     Pd Ints         : 000124BD
%H>     Watchdog To     : 00000000
%H> ErrEnd.

STATUS Block @ 0x30134030
```

Test A

Test B

Command    : xxxxxxxxxxxxxxxxxxxxxxxxxx
Start Time: xxxxxxxxxxxxxxxxxxxxxxxxx
End time:   xxxxxxxxxxxxxxxxxxxxxxxxx
Disk Location: xxxxxxxxxxxxxxxxxxxxxxxxxx
Error Index: xxxxxxxxxxxxxxxxxxxxxxx
Flags: xxxxxxxxxxxxxxxxxxxxxxxxxxx
Loop number: xxxxxxxxxxxxxxxxxxxxxx Command    : GIGETST / FLB_DCPU SPAWN TSTLOOP 10000 ADMA_BGT NSIO_BGT KKCS 7 ADDR 1B0951D00 LEN 10000
Start Time: 00:28:16.81 10-28-03
End time:   00:29:01.35 10-28-03
Disk Location: 0x1BFD003
Error Index: -1
Flags: 0x8                    Mem Info Index:  21
Loop number : 2               Env Data:  0x3BD3

Command    : GIGETST / FLB_DCPU SPAWN TSTLOOP 10000 ADMA_BGT NSIO_BGT KKCS 7 ADDR 1B0961D00 LEN 10000
Start Time: 00:29:01.75 10-28-03
End time:   00:29:22.33 10-28-03
Disk Location: 1BFF105
Error index: 12               Mem info index:  22
Flags: 0x84                   Env Data:  0x3BD3
Loop number : 2

Command    : xxxxxxxxxxxxxxxxxxxxxxxxxx
Start Time: xxxxxxxxxxxxxxxxxxxxxxxxx
End Time:   xxxxxxxxxxxxxxxxxxxxxxxxx
Disk Location: xxxxxxxxxxxxxxxxxxxxxxxxxx
Error Index: xxxxxxxxxxxxxxxxxxxxxxx
Flags: xxxxxxxxxxxxxxxxxxxxxxxxxxx
Loop number: xxxxxxxxxxxxxxxxxxxxxx

*FIG. 9*

METHOD FOR ANALYZING DATA STORAGE SYSTEM TEST DATA

This application incorporates by reference, in their entirety, the following co-pending patent applications all assigned to the same assignee as the present invention:

| INVENTORS | FILING DATE | SERIAL NO. | TITLE |
| --- | --- | --- | --- |
| Yuval Ofek et al. | Mar. 31, 2000 | 09/540,828 | Data Storage System Having Separate Data Transfer Section And Message Network |
| Paul C. Wilson et al. | Jun. 29, 2000 | 09/606,730 | Data Storage System Having Point-To-Point Configuration |
| John K. Walton et al. | Jan. 22, 2002 | 10/054,241 | Data Storage System (Divisional of 09/223,519 filed 12/30/1998) |
| Christopher S. MacLellan et al. | Dec. 21, 2000 | 09/745,859 | Data Storage System Having Plural Fault Domains |
| John K. Walton | May 17, 2001 | 09/859,659 | Data Storage System Having No-Operation Command |
| Castel et al. | Mar. 28, 2002 | 10/109,583 | Data Storage System |

TECHNICAL FIELD

This invention relates generally to data storage systems and more particularly to methods for testing and analyzing results of such tests. Still more particularly, the invention relates to a method for presenting the results of such testing in a user-friendly format.

BACKGROUND AND SUMMARY

As is known in the art, one type of data storage system includes an interface disposed between a host computer/server and a back of disk drives. One such system is described in U.S. Pat. No. 6,651,130 entitled "Data Storage System Having Separate Data Transfer Section and Message Network with Bus Arbitration, inventor Robert Thibault, issued Nov. 18, 2003, assigned to the same assignee as the present invention, the entire subject matter thereof being incorporated herein by reference. As described therein, the system includes host computer/server controllers, or directors, disk controllers, or directors, and cache memory interconnected through a backplane printed circuit board. More particularly, disk directors are mounted on disk director printed circuit boards. The host computer/server directors are mounted on host computer/server controller printed circuit boards. And, cache memories are mounted on cache memory printed circuit boards. The disk directors, host computer/server directors, and cache memory printed circuit boards plug into different slots of the backplane printed circuit board, as shown in FIG. 7 and as described in more detail in the above-referenced U.S. patent application Ser. No. 10/109,583. More particularly, each one of the director boards includes a plurality of director CPUs. For example, as described in the above-referenced U.S. Pat. No. 6,651,130 each director board includes four director CPUs.

One method used to test such system includes testing using a diagnostic code package. The diagnostic code is made of embedded code which resides on each tested director or memory printed circuit board, and of a script which resides on a computer, e.g., the PC which is connected to the system under test as described above. The diagnostics process is actually a set of tests which are executed on the printed circuit boards and their purpose is to verify the system is functioning properly and ready for the customer. The script on the PC is executing the tests on the boards by sending commands to each board; the results of the test are logged into text files on the PC.

It follows then that as the number of CPUs per director board increases, for example to a system wherein each director board has 8 CPUs and the system has 16 director boards, there are 128 log files created plus 4 more log files from environmental boards and a few logs generated by the script. A pair of such logs for a corresponding pair of director CPUs appears, for example, as follows:

```
%H>GO GIGETST / FLB_DCPU SPAWN TSTLOOP 10000 DMA_BGT SADD_BGT KKCS 7 ADDR 1B0951D00 LEN 10000
%H>TASK START TIME: *00:28:16.81 10-28-03
%H>anath6-4>
%H>---[id # 00C9 Gigabit Ethernet Utilities & Tests]
%H>
%H>Gigabit Ethernet Utilities & Tests PASSED.
%H>
%H>TASK DONE
%H>TASK END TIME: *00:29:01.35 10-28-03
%H>GO GIGETST / FLB_DCPU SPAWN TSTLOOP 10000 ADMA_BGT NSIO_BGT KKCS 7 ADDR 1B0961D00 LEN 10000
%H>TASK START TIME: *00:29:01.75 10-28-03
%H>anath6-4>
%H>---[id # 00C9 Gigabit Ethernet Utilities & Tests]
%H>Data not appended3
%H>T3::appnd_io_ink( ) returned erro
%H>num_pckts=10000 last_rcv_cnt=10400 num_pckts_done=10800 num_pckts_to_be_sent=10000
%H>Gig Ethernet Dual cpu Full Loopback test . . . FAILED Loop 0
```

-continued

```
%H>
%H>ERROR:    ErrCode: 00C900070A0A000A Slot: 3 CPU: 11
%H>          ErrTime: *00:29:21.37 10-28-03
%H>          TaskStartTime: *00:29:01.75 10-28-03
%H>          Loop: 1 of 1 CLoop: 0 of 1
%H>          TestDesc: FIGE gigabit ethernet test
%H>          SubtDesc: Dual Cpu Synchronous Full Loopback Test
%H>          ErrGroup: FIGE lback Errs group
%H>          ErrDesc: Link cpu failed to complete I/O
%H>
%H>ErrDetail:
%H>
%H>          * Link cpu failed to complete I/O:
%H>          ----------------------------------------------------------------
%H>
%H>
%H>          * General Gige test information:
%H>          ----------------------------------------------------------------
%H>
%H>          Inner Loop:     00000000
%H>          Packet Len:     000005DC
%H>          Packet Num:     00000001
%H>          Pckt Tx'd:      00030000
%H>          Pckt Rx'd:      00010800
%H>          Pci Ints:       000124BD
%H>          Watchdog TO:    00000000
%H>ErrEnd.
%H>
%H>                          STATUS Block @ 0x30134030
```

In order to understand events and errors which occurred on the system, many times, the inventor has recognized that the is a need to take a look at more than one log file and understand what was happening across the system at that time. Looking for the information at 132 log file is difficult if not impossible. In other words: There is a need for a tool that will reduce the debug time, in order to understand engineering and manufacturing issues.

In accordance with the present invention, the method includes testing each one of the CPUs on each one of the plurality of director printed circuit. Results from such test are collected in a memory of a computer. The results are collected in a predetermined format. The method processes the collected data to present the results of the tests on a display of the computer in a different format. The different format comprises lines of information on the computer display. Each one of the lines of information identifies a corresponding one of the CPUs and indicates whether such corresponding one of the CPUs passed or failed the testing thereof.

In one embodiment, the processing includes presenting the results of the tests as a second set of lines of information on a different view of the computer display. The second set of lines of information identifies each one of the CPUs and the operating states thereof when the plurality of CPUs were tested and operated during a selected, common, period of time.

In one embodiment, the system includes a environmental printed circuit board interconnected to the plurality of director printed circuit boards and the memory printed circuit board through a backplane. The environmental printed circuit board is plugged into a different slot of such backplane. The environmental printed circuit board, the plurality of director printed circuit boards and the memory printed circuit board have thereon sensors for measuring voltages produced on such printed circuit boards and operating temperatures of such printed circuit boards. The environmental printed circuit board has thereon circuitry for producing signals representative of the measured voltages and temperatures during the testing. The method includes: collecting the produced signals in the memory of the computer. The results are collected in a predetermined format. The method processes the collected data to present the results of the tests on a display of the computer in a different format. The different format comprises lines of information on the computer display. Each one of the lines of information identifies a corresponding one of the boards and presents the temperature and voltages of such corresponding one of the boards.

More particularly, the method collects results from such tests in a memory of a computer. The results are collected in a predetermined format, such format comprising a plurality of data structures. Each one of such data structures is associated with a corresponding one of the CPUs. The method processes the collected data from the plurality of data structures to combine the plurality of data structures into a common, linked data structure. The method presents data in the linked data structure on a display of the computer as lines of information. Each one of the lines of information identifies a corresponding one of the CPUs and indicating whether such corresponding one of the CPUs passed or failed the testing thereof. The method presents a second set of lines of information on a different view of the computer display, the second set of lines of information identifying each one of the CPUs and the operating states thereof when the plurality of CPUs were tested and operated during a selected, common, period of time.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 8–13 show display screens of the PC shown in FIG. 5, such display screen providing information in a format according to the invention, such information being used to analyze test data obtained from testing the system of FIG. 1.

Like reference symbols in the various drawings indicate like elements.

DETAILED DESCRIPTION

Figure 1:
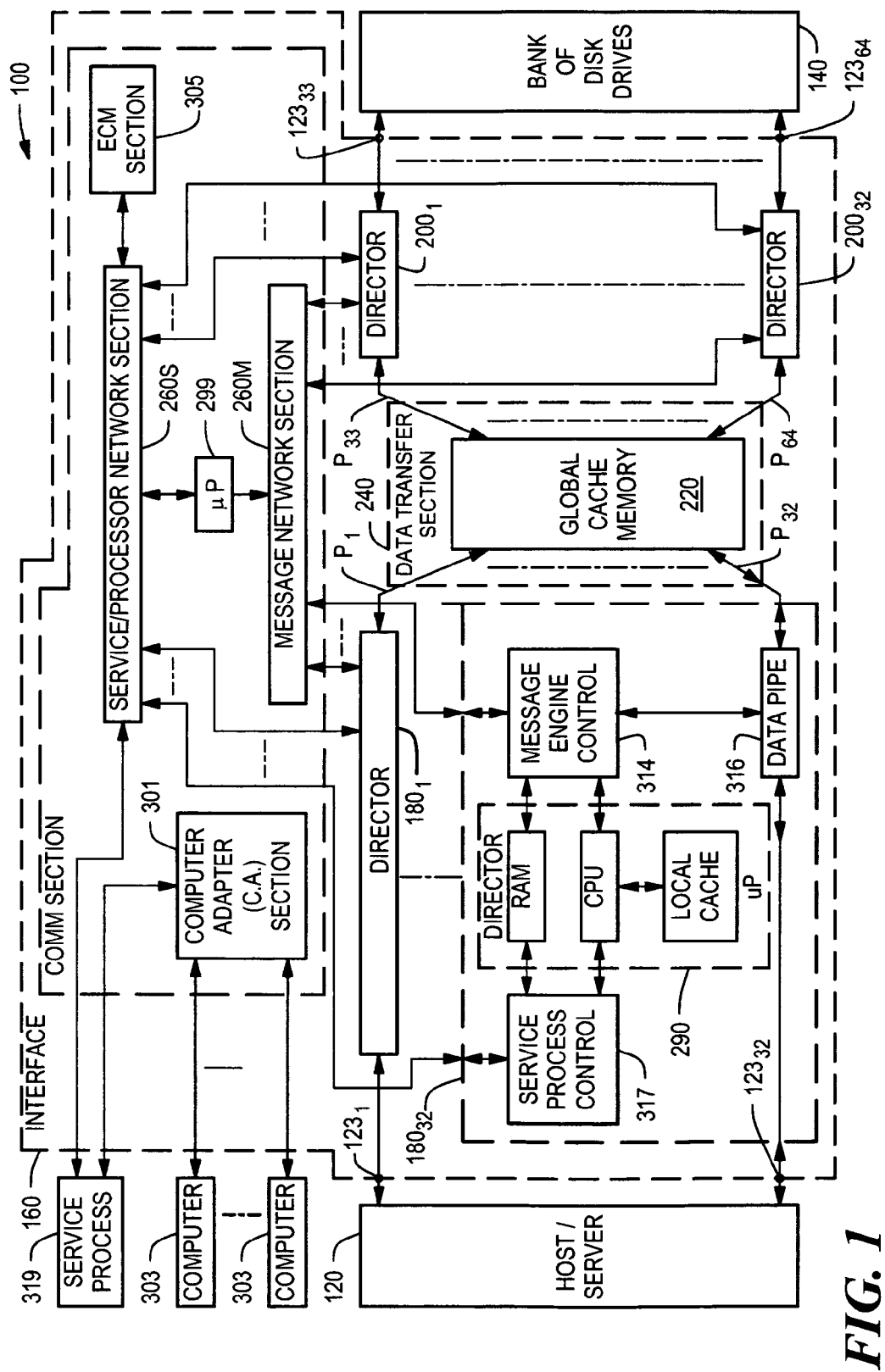
FIG. 1 is a block diagram of a data storage system according to the invention.
Figure 2:
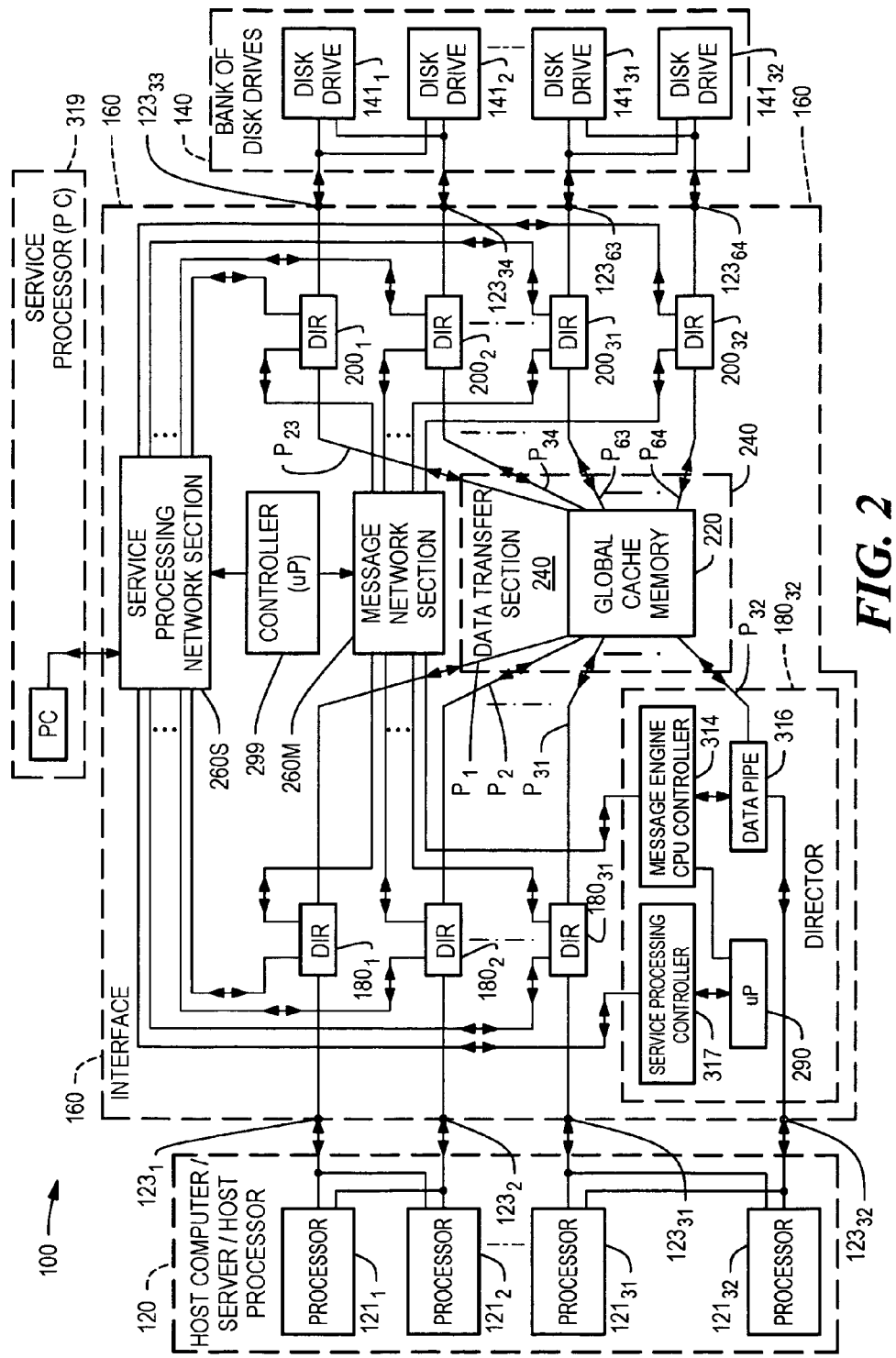
FIG. 2 is a more detailed block diagram of a data storage system according to the invention.

Referring now to FIGS. 1 and 2, a data storage system 100 is shown for transferring data between a host computer/server 120 and a bank of disk drives 140 through a system interface 160. The system interface 160 includes: a plurality of, here 32 front-end directors $180_1$–$180_{32}$ coupled to the host computer/server 120 via ports $123_1$–$123_{32}$; a plurality of back-end directors $200_1$–$200_{32}$ coupled to the bank of disk drives 140 via ports $123_{33}$–$123_{64}$; a data transfer section 240, having a global cache memory 220, coupled to the plurality of front-end directors $180_1$–$180_{32}$ and the back-end directors $200_1$–$200_{32}$; a messaging network 260M and service processor network section 260S, operative independently of the data transfer section 240 under control of a common microprocessor 299, coupled to the plurality of front-end directors $180_1$–$180_{32}$ and the plurality of back-end directors $200_1$–$200_{32}$, as shown. The front-end and back-end directors $180_1$–$180_{32}$, $200_1$–$200_{32}$ are functionally similar. Thus, as shown for an exemplary one of the front and back-end directors, here front-end director $180_{32}$, such director $180_{32}$ is shown to include: a microprocessor (µP) 290 (i.e., a central processing unit (CPU) and local cache memory (RAM)); a message engine/CPU controller 314, a data pipe 316, and a service processor controller 317. The message engine CPU controller 314 and data pipe 316 together with their operation with the microprocessor 290 are described in detail in co-pending patent application Ser. No. 09/540,828 entitled "Data Storage System Having Separate Data Transfer Section and Message Network", filed Mar. 31, 2000, Ofek et al. and assigned to the same assignee as the present invention, the entire subject matter thereof being incorporated herein by reference. Suffice it to say here, however, that the front-end and back-end directors $180_1$–$180_{32}$, $200_1$–$200_{32}$ control data transfer between the host computer/server 120 and the bank of disk drives 140 in response to messages passing between the directors $180_1$–$180_{32}$, $200_1$–$200_{32}$ through the message network 260M. The messages facilitate the data transfer between host computer/server 120 and the bank of disk drives 140 with such data passing through the global cache memory 220 via the data transfer section 240. Thus, data passes between the host computer 120 and the back of disk drives 140 through the data pipes 317 via the global cache memory 240 under control of the message network 260M as described in detail in the above referenced copending patent application. The service processor network section 260S enables a service processor 319, here having a personal computers PC as shown in FIG. 2, to communicate with any one of the front-end directors $180_1$–$180_{32}$ or any one of the back-end directors $200_1$–$200_{32}$ under control of the service processor network section 260S, in a manner described in more detail in U.S. Pat. No. 6,597,232 entitled "Data Storage Having Environmental Communication Module (ECM), inventor Steven Burnham, issued Jul. 22, 2003 to the same assignee as the present invention, the entire subject matter thereof being incorporated herein by reference. Suffice it to say here, however, that the PC has access to any one of the directors $180_1$–$180_{32}$, $200_1$–$200_{32}$ via the service processor network section 260S.

More particularly, and considering the message network 260M, in the case of the front-end directors $180_1$–$180_{32}$, the data passes between the host computer to the global cache memory 220 through the data pipe 316 in the front-end directors $180_1$–$180_{32}$ and the messages pass' through the message engine/CPU controller 314 in such front-end directors $180_1$–$180_{32}$. In the case of the back-end directors $200_1$–$200_{32}$ the data passes between the back-end directors $200_1$–$200_{32}$ and the bank of disk drives 140 and the global cache memory 220 through the data pipe 316 in the back-end directors $200_1$–$200_{32}$ and again the messages pass through the message engine/CPU controller 314 in such back-end director $200_1$–$200_{32}$.

With such an arrangement, the cache memory 220 in the data transfer section 240 is not burdened with the task of transferring the director messaging. Rather, the message network and service processor network 260M, 260S operates independent of the data transfer section 240 thereby increasing the operating bandwidth of the system interface 160.

Each front-end director $180_1$–$180_{32}$ includes a microprocessor (µP) 299 (i.e., a central processing unit (CPU) and RAM) described in detail in the referenced patent application.

The interface 160 also includes a computer adapter (CA) network 301, FIG. 1, adapted for coupling one or more of a plurality of computers 303 to the PCs in the service processor 319. Further, the interface 160 also includes environmental communication modules (ECM) 305, coupled to the service processor network section 260S, as shown. The computer adapter network 301 is described in more detail in the U.S. Pat. No. 6,597,232 above.

Figure 3:
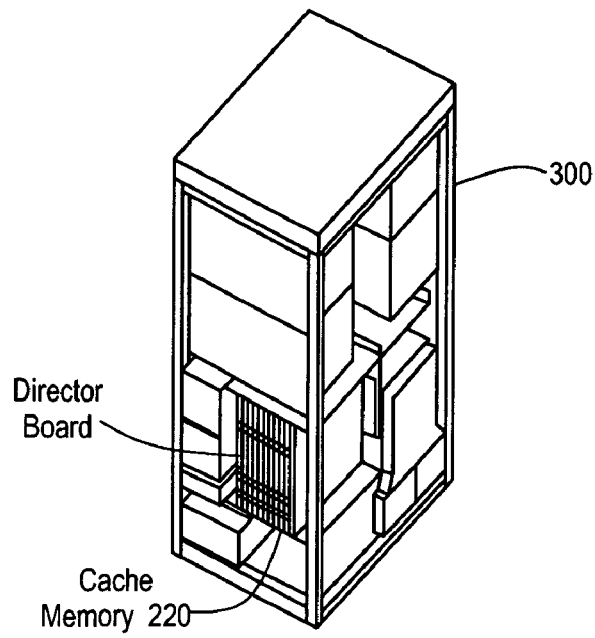
FIG. 3 is a sketch of an electrical cabinet storing a system interface used in the data storage system of FIG. 1.
Figure 4:
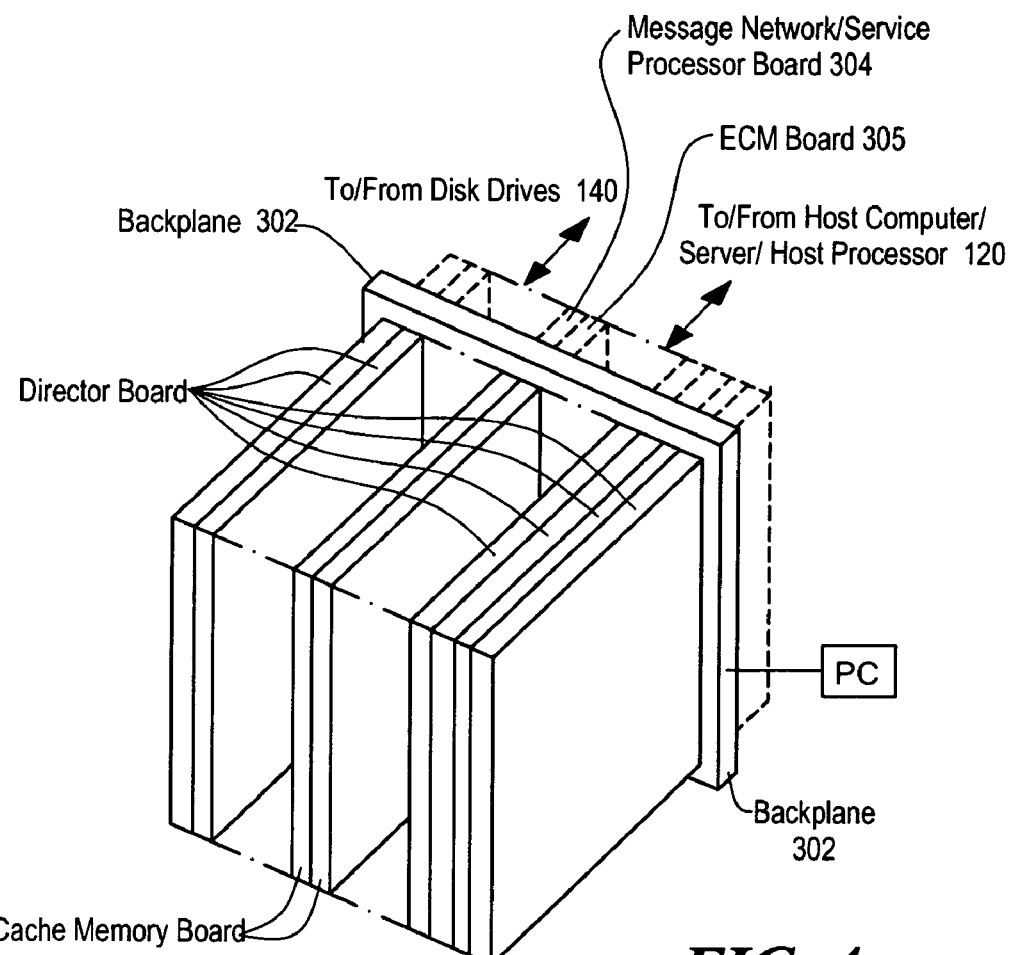
FIG. 4 is a diagrammatical, isometric sketch showing printed circuit boards providing the system interface of the data storage system of FIG. 1.
Figure 5:
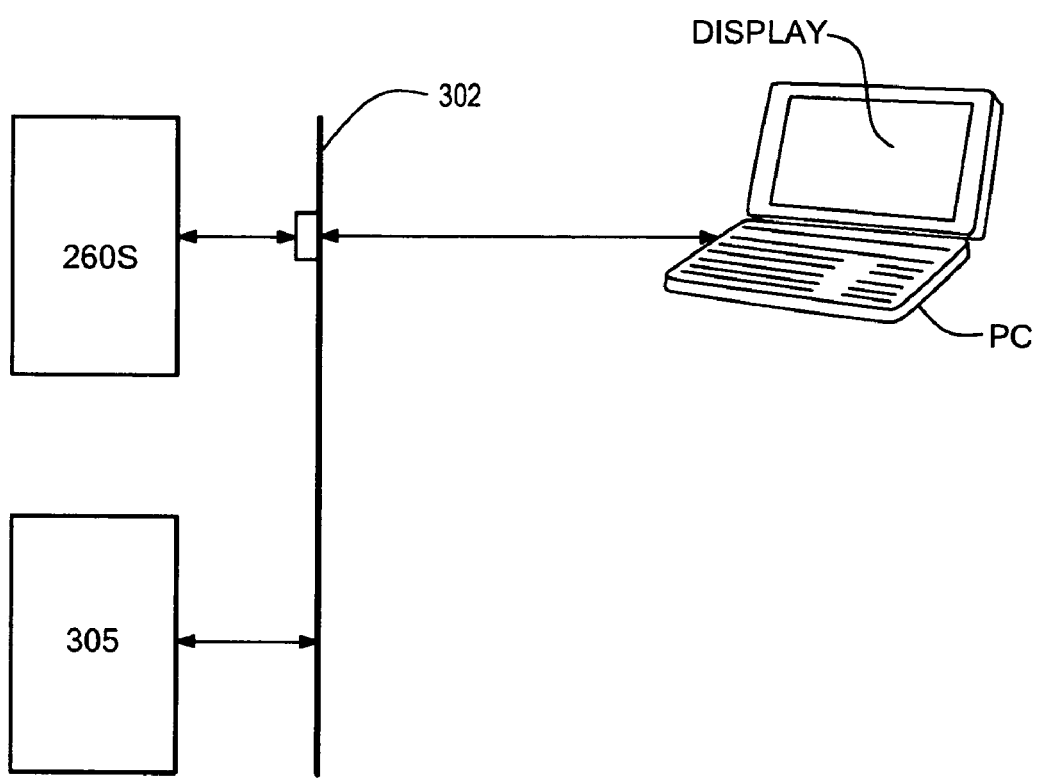
FIG. 5 is a block diagram of a portion of the system interface used in the data storage system of FIG. 1 connected to a PC.

Referring now to FIGS. 3 and 4, the system interface 160 is shown to include an electrical cabinet 300 having stored therein: a plurality of, here eight front-end director boards $190_{1–1908}$, each one having here four of the front-end directors $180_1$–$180_{32}$; a plurality of, here eight back-end director boards $210_1$–$210_8$, each one having here four of the back-end directors $200_1$–$200_{32}$; and a plurality of, here eight, memory boards 220 which together make up the global cache memory 220. (It is noted that the cabinet 300 may store the PC shown in FIG. 3). These boards plug into the front side of a backplane 302. (It is noted that the backplane 302 is a mid-plane printed circuit board). Plugged into the backside of the backplane 302 is a message network/service processor board 304, the ECM board 305 and the PC, as shown in FIGS. 4 and 5. It should be noted that the message network/service processor board 304 includes: a service processor network section 260S (FIG. 2), a message network 260M, a microprocessor 299, and a computer adapter (CA) network 301, as described in the U.S. Pat. No. 6,597,232 above. The connections to and from the CA network are described in more detail in the U.S. Pat. No. 6,597,232 above. Also plugged into the backside of the backplane 302 is the ECM section 305 (FIG. 2) as described in more detail in the U.S. Pat. No. 6,597,232 above. The backside of the backplane 302 has plugged into it adapter boards, not shown in FIGS. 2 and 3, which couple the boards plugged into the backside of the backplane 302 with the computer 120 and the bank of disk drives 140. That is, referring again briefly to FIG. 1, an I/O adapter, not shown, is coupled between each one of the front-end directors $180_1$–$180_{32}$ and the host computer 120 and an I/O adapter, not shown, is coupled between each one of the back-end directors $200_1$–$200_{32}$ and the bank of disk drives 140. More particularly, each one of the I/O adapter, not shown, is plugged into the backplane behind a corresponding one of the director boards. As noted above, the ECM board 305 and message network/service processor board 304 plug into the backplane behind the memory boards, FIG. 4.

Referring now again to FIG. 1, it is noted that the service processor network 260S provides communication between the service processor 319 and the front-end and back-end directors $180_1$–$180_{32}$, $200_1$–$200_{32}$. As described in the above-referenced U.S. Pat. No. 6,597,232, the service processor 319 includes a PC, and that there is a service processor network 260S. As described in the above-referenced U.S. Pat. No. 6,597,232, the PC has access to the service processor network 260.

Figure 6:
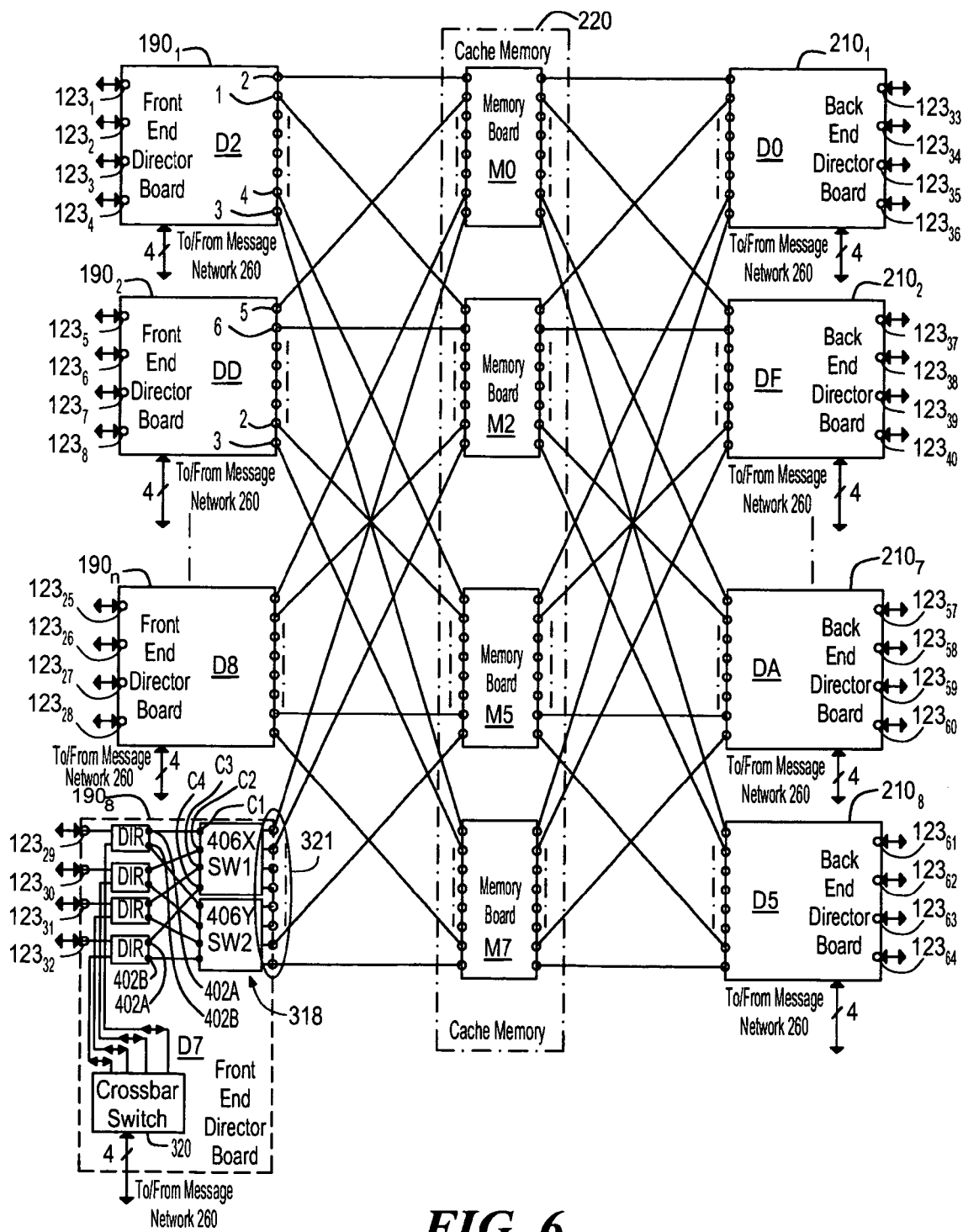
FIG. 6 is a diagram showing the interconnections between director boards and memory boards used in the interface used in the system of FIG. 1.
Figure 7:
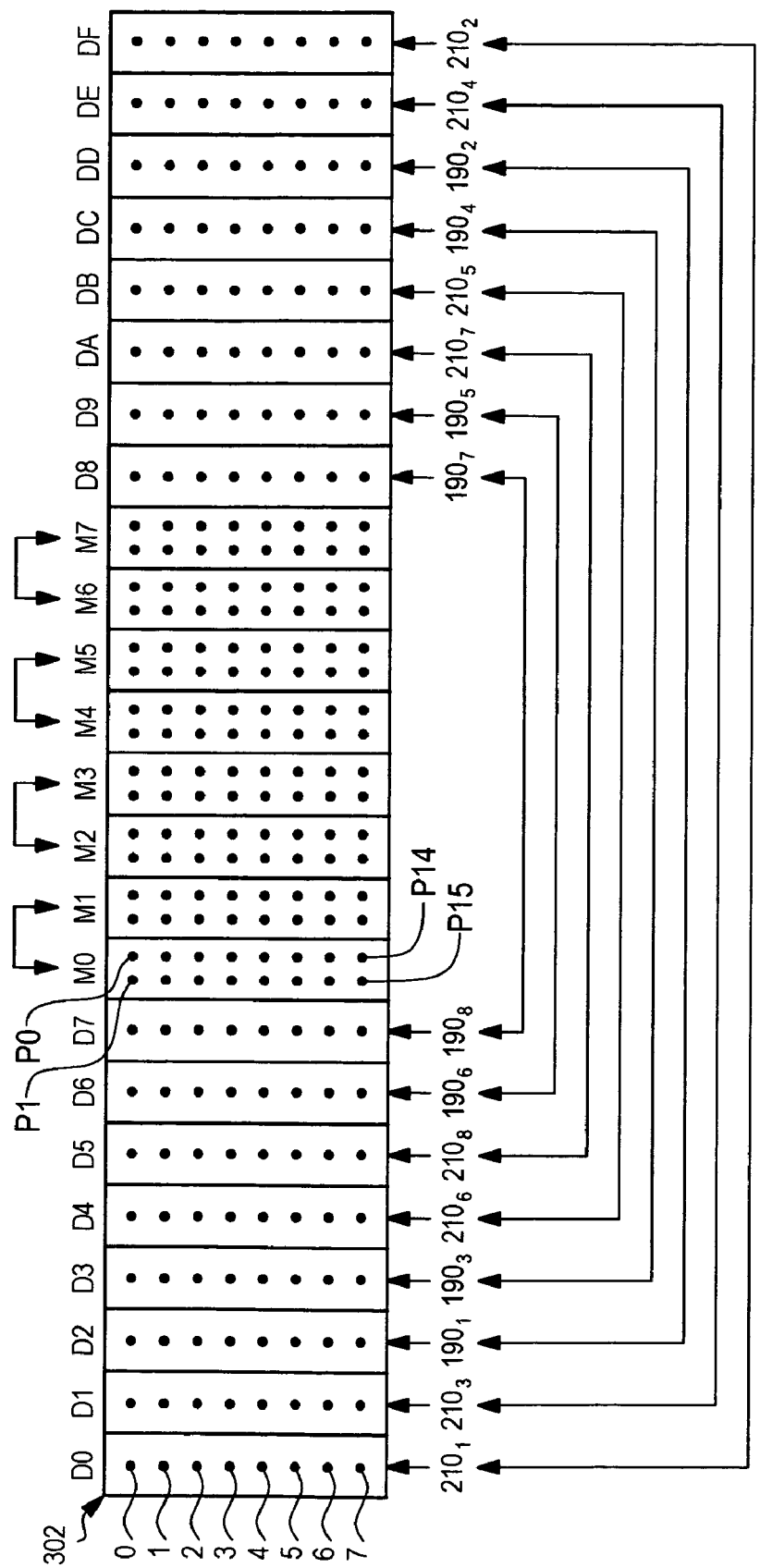
FIG. 7 is an elevation view of a backplane used in the system of FIG. 1, such backplane having slots adapted to receive front-end director printed circuit boards, back-end director printed circuit boards and memory boards.

Referring now to FIG. 6, and as described in more in the co-pending patent applications referred to above, each one of the director boards $190_1$–$210_8$ includes, as noted above four of the directors $180_1$–$180_{32}$, $200_1$–$200_{32}$ (FIG. 1). It is noted that the director boards $190_1$–$190_8$ having four front-end directors per board, $180_1$–$180_{32}$ are referred to as front-end directors and the director boards $210_1$–$210_8$ having four back-end directors per board, $200_1$–$200_{32}$ are referred to as back-end directors. Each one of the directors $180_1$–$180_{32}$, $200_1$–$200_{32}$ includes the microprocessor 299 referred to above), the message engine/CPU controller 314, and the data pipe 316 shown in FIG. 1.

The front-end director boards have ports $123_1$–$123_{32}$, as shown in FIG. 1, coupled to the processors $121_1$–$121_{32}$, as shown. The back-end director boards have ports $123_{33}$–$123_{64}$, as shown in FIG. 2, coupled to the disk drives $141_1$–$141_{32}$, as shown.

Each one of the director boards $190_1$–$210_8$ includes a crossbar switch 318 as shown in FIG. 6. The crossbar switch 318 has four input/output ports $C_1$–$C_4$, each one being coupled to the data pipe 316 (FIG. 1) of a corresponding one of the four directors $180_1$–$180_{32}$, $200_1$–$200_{32}$ on the director board $190_1$–$210_8$. The crossbar switch 318 has eight output/input ports collectively identified in FIG. 6 by numerical designation 321 (which plug into the backplane 302). The crossbar switch 318 on the front-end director boards $191_1$–$191_8$ is used for coupling the data pipe 316 of a selected one of the four front-end directors $180_1$–$180_{32}$ on the front-end director board $190_1$–$190_8$ to the global cache memory 220 via the backplane 302 and I/O adapter, not shown. The crossbar switch 318 on the back-end director boards $210_1$–$210_8$ is used for coupling the data pipe 316 of a selected one of the four back-end directors $200_1$–$200_{32}$ on the back-end director board $210_1$–$210_8$ to the global cache memory 220 via the backplane 302 and I/O adapter, not shown. Thus, referring to FIG. 1, the data pipe 316 in the front-end directors $180_1$–$180_{32}$ couples data between the host computer 120 and the global cache memory 220 while the data pipe 316 in the back-end directors $200_1$–$200_{32}$ couples data between the bank of disk drives 140 and the global cache memory 220. It is noted that there are separate point-to-point data paths $PTH_1$–$PTH_{64}$ (FIG. 1) between each one of the directors $180_1$–$180_{32}$, $200_1$–$200_{32}$ and the global cache memory 220. It is also noted that the backplane 302 is a passive backplane because it is made up of only etched conductors on one or more layers of a printed circuit board. That is, the backplane 302 does not have any active components.

Further, as described in the co-pending patent applications referred to above, crossbar switch 320 (FIG. 6) plugs into the backplane 302 and is used for coupling to the directors to the message network 260 (FIG. 2) through the backplane.

Referring again to FIG. 6, the crossbar switch 318 includes a pair of crossbar switches 406X, 406Y. Each one of the switches 406X, 406Y includes four input/output director-side ports $C_1$–$C_4$ and the four input/output memory-side ports collectively designated in FIG. 5 by numerical designation 321. The director-side ports $C_1$–$C_4$ of switch 406X are connected to the four directors on the director board, as indicated, and as described in more detail in the co-pending patent applications referred to above. Likewise, director-side ports $C_1$–$C_4$ of switch 406Y are also connected to the dual-ported directors on such board, as indicated. Thus, as described in the co-pending patent applications referred to above, each director is a dual-ported directors.

Each one of the ports $C_1$–$C_4$ may be coupled to a selected one of the four ports collectively designated by 321 in accordance with control words provided to the switch 406X by the directors on such board, respectively, as described in the above-referenced patent application. Suffice it to say here, that port 402A of any one of the directors $180_1$, $180_3$, $180_5$, $180_7$ may be coupled to any one of the ports 321 of switch 406X, selectively in accordance with the control words. The coupling between the director boards $190_1$–$190_8$, $210_1$–$210_8$ and the global cache memory 220 is shown in FIG. 6 and is described in the above-referenced patent application Ser. No. 10/109,583. Likewise for switch 406Y.

More particularly, and referring also to FIG. 1, as noted above, each one of the host computer processors $121_1$–$121_{32}$ in the host computer 120 is coupled to a pair of the front-end directors $180_1$–$180_{32}$, to provide redundancy in the event of a failure in one of the front end-directors $181_1$–$181_{32}$ coupled thereto. Likewise, the bank of disk drives 140 has a plurality of, here 32, disk drives $141_1$–$141_{32}$, each disk drive $141_1$–$141_{32}$ being coupled to a pair of the back-end directors $200_1$–$200_{32}$, to provide redundancy in the event of a failure in one of the back-end directors $200_1$–$200_{32}$ coupled thereto). Thus, considering exemplary host computer processor $121_1$, such processor $121_1$ is coupled to a pair of front-end directors $180_1$, $180_2$. Thus, if director $180_1$ fails, the host computer processor $121_1$ can still access the system interface 160, albeit by the other front-end director $180_2$. Thus, directors $180_1$ and $180_2$ are considered redundancy pairs of directors. Likewise, other redundancy pairs of front-end directors are: front-end directors $180_3$, $180_4$; $180_5$, $180_6$; $180_7$, $180_8$; $180_9$, $180_{10}$; $180_{11}$, $180_{12}$; $180_{13}$, $180_{14}$; $180_{15}$, $180_{16}$; $180_{17}$, $180_{18}$; $180_{19}$, $180_{20}$; $180_{21}$, $180_{22}$; $180_{23}$, $180_{24}$; $180_{25}$, $180_{26}$; $180_{27}$, $180_{28}$; $180_{29}$, $180_{30}$; and $180_{31}$, $180_{32}$ (only directors $180_{31}$ and $180_{32}$ being shown in FIG. 2).

Likewise, disk drive $141_1$ is coupled to a pair of back-end directors $200_1$, $200_2$. Thus, if director $200_1$ fails, the disk drive $141_1$ can still access the system interface 160, albeit by the other back-end director $180_2$. Thus, directors $200_1$ and $200_2$ are considered redundancy pairs of directors. Likewise, other redundancy pairs of back-end directors are: back-end directors $200_3$, $200_4$; $200_5$, $200_6$; $200_7$, $200_8$; $200_9$, $200_{10}$; $200_{11}$, $200_{12}$; $200_{13}$, $200_{14}$; $200_{15}$, $200_{16}$; $200_{17}$, $200_{18}$; $200_{19}$, $200_{20}$; $200_{21}$, $200_{22}$; $200_{23}$, $200_{24}$; $200_{25}$, $200_{26}$; $200_{27}$, $200_{28}$; $200_{29}$, $200_{30}$; and $200_{31}$, $200_{32}$ (only directors $200_{31}$ and $200_{32}$ being shown in FIG. 2).

As noted above, there are four directors on each one of the director boards. The physical position of the director boards along with a positional designation, are shown in FIG. 5 (e.g., director board $190_1$ also has the designation D2) and is described in more detail in the above-referenced patent application Ser. No. 10/109,583.

The system 100 shown in FIG. 2 is tested in manufacturing and engineering with a diagnostic code package. The diagnostic code is made of embedded code which resides on each tested board, and of a script which resides on the PC which is connected to the system 100. The diagnostics process is actually a set of tests which are executed on the board and their purpose is to verify the system is functioning properly and ready for the customer. The script on the PC is executing the tests on the boards by sending commands to each board; the results of the test are logged into text files on the PC.

The PC processes all the log files from a specific test, and converting the raw text into a set of linked data structures that can be queried and displayed in a more simple way that will help technicians and engineers understand events and errors during the test.

As will be described in an example in connection with FIGS. 8 through 12, the PC is programmed for analyzing test data obtained from the data storage system 100. The method includes testing each one of the CPUs on each one of the plurality of director printed circuit. Results from such test are collected in a memory of a computer. The results are collected in a predetermined format. The method processes the collected data to present the results of the tests on a display of the computer in a different format. The different format comprises lines of information on the computer display. Each one of the lines of information identifies a corresponding one of the CPUs and indicates whether such corresponding one of the CPUs passed or failed the testing thereof.

The processing includes presenting the results of the tests as a second set of lines of information on a different view of the computer display. The second set of lines of information identifies each one of the CPUs and the operating states thereof when the plurality of CPUs were tested and operated during a selected, common, period of time.

As noted above, the system includes a environmental printed circuit board interconnected to the plurality of director printed circuit boards and the memory printed circuit board through a backplane. The environmental printed circuit board is plugged into a different slot of such backplane. The environmental printed circuit board has thereon circuitry for producing signals representative of the measured voltages and temperatures during the testing. The method includes: collecting the produced signals in the memory of the computer. The results are collected in a predetermined format. The method processes the collected data to present the results of the tests on a display of the computer in a different format. The different format comprises lines of information on the computer display. Each one of the lines of information identifies a corresponding one of the boards and presents the temperature and voltages of such corresponding one of the boards.

Thus, the method collects results from such tests in a memory of a computer. The results are collected in a predetermined format, such format comprising a plurality of data structures. Each one of such data structures is associated with a corresponding one of the CPUs. The method processes the collected data from the plurality of data structures to combine the plurality of data structures into a common, linked data structure. The method presents data in the linked data structure on a display of the computer as lines of information. Each one of the lines of information identifies a corresponding one of the CPUs and indicating whether such corresponding one of the CPUs passed or failed the testing thereof.

The method presents a second set of lines of information on a different view of the computer display, the second set of lines of information identifying each one of the CPUs and the operating states thereof when the plurality of CPUs were tested and operated during a selected, common, period of time.

Figure 8:
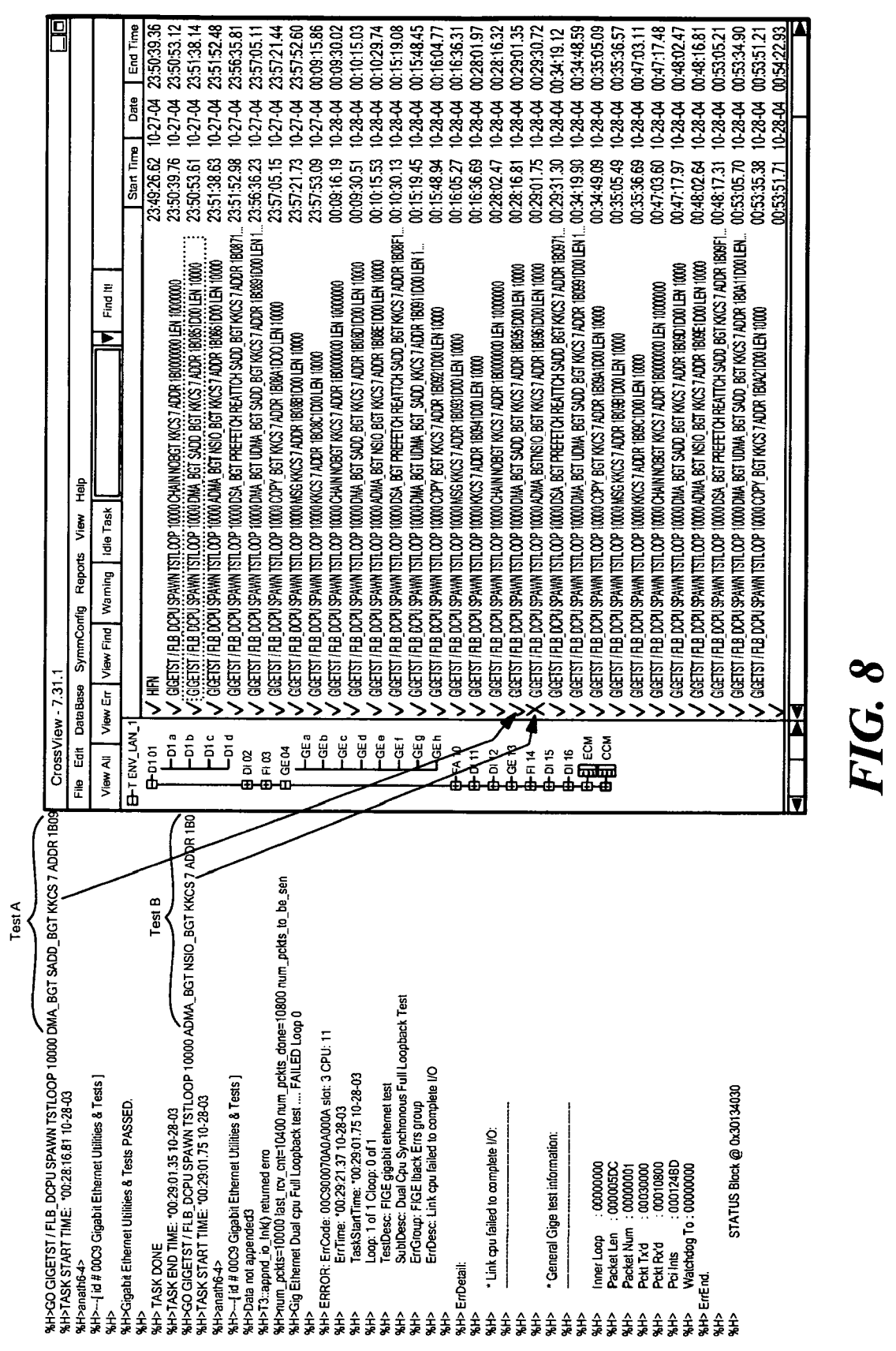

Referring now to FIG. 8, the left side is a snapshot from a raw log file that is generated by each CPU on each director board. Here two tests are shown, TEST A and TEST B for a pair of CPUs, respectively. The right side shows how the same data looks on the PC display after being processed by the PC in accordance with the method programmed in to the PC. Each test for each CPU is represented in a single line on the display (i.e., shown in the right side of FIG. 8). The line contains information on the test that was running, it's execution time and whether the CPU corresponding to such line passed or failed. This example shows how 10 lines of text and white spaces on the left are turning into a single line on the display. Notice how the test TEST A passed, indicated by the check mark and TEST B failed, is marked with an X, the user can later double click on this line and go to the actual log file.

Referring now to FIG. 9, the left side is a snapshot form the raw log file. Each test is being converted into an object that is being appended to an array of objects per CPU. The example will show a small portion of the array with 4 objects. The one at the top and one at the bottom are not related to the example and just show that there is a sequence of tests. The 2 in the middle represent the tests from the log file on the left and they show how the data is represented in memory.

Figure 10:
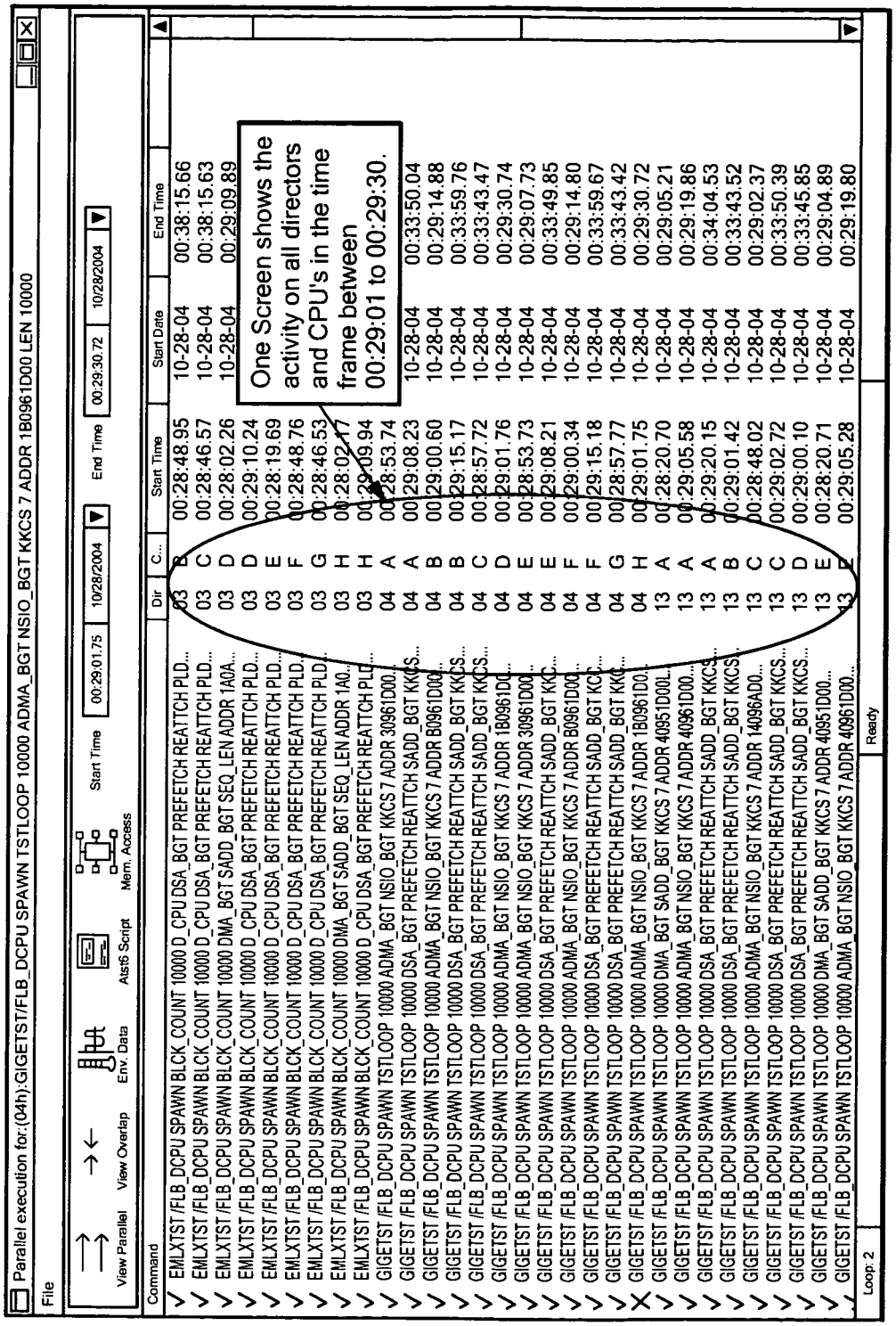

Referring now to FIG. 10, this screen on the PC's display shows the user what was running on the system at any given time. The user will choose any test from any CPU and display will show the user all the tests that ran on all the CPU in the system within this time frame.

Figure 11:
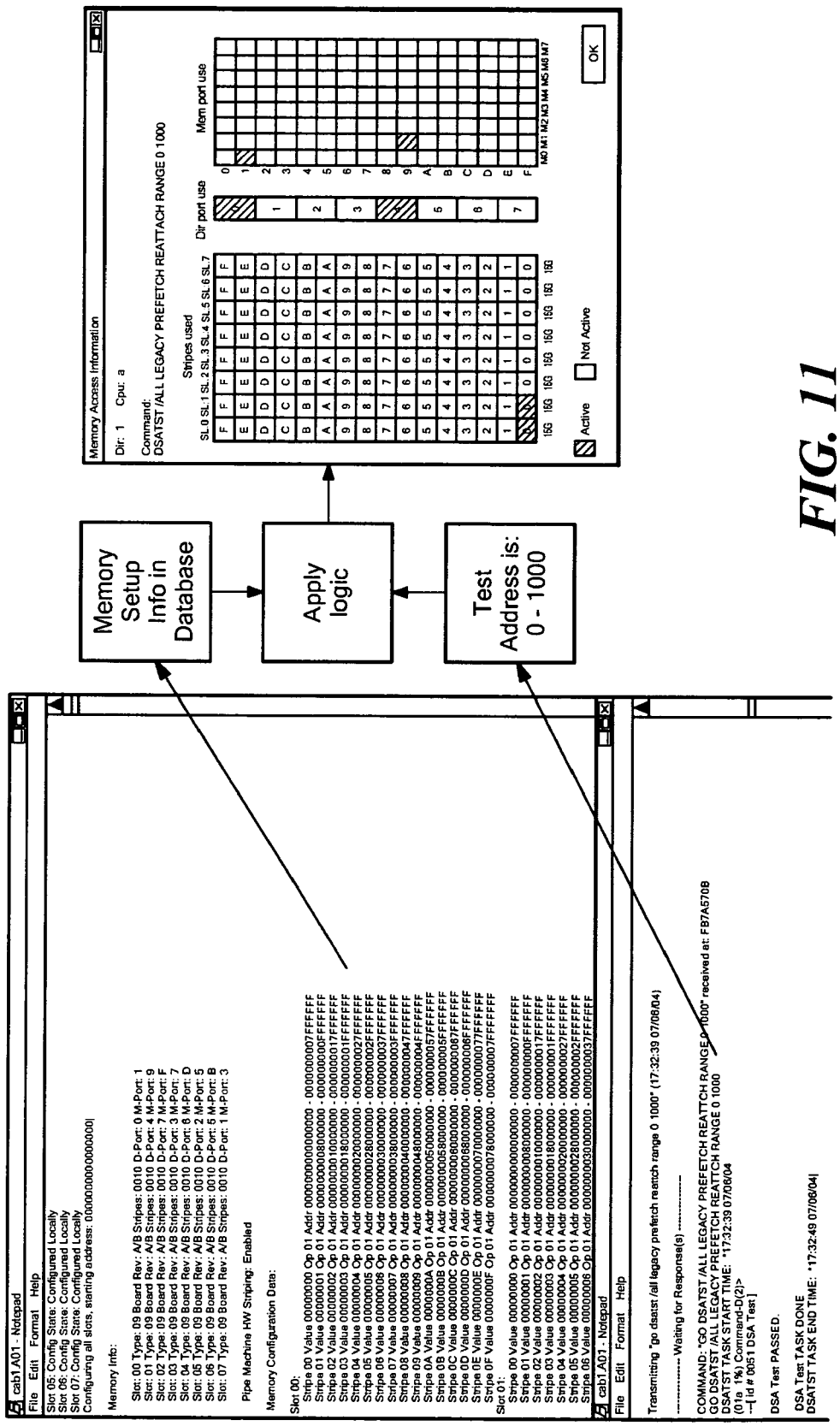

Referring now to FIG. 11, a screen on the PC display is shown which provides information that may be used to understand which memory board was tested. The PC display, shown on the right, shows which memory board or boards were active when the test was running and what ports were used on the memory and director. This is valuable information and gathering it manually takes a lot of time, since the person looking at the logs has to use multiple files and documents to understand obtain the information.

Figure 12:
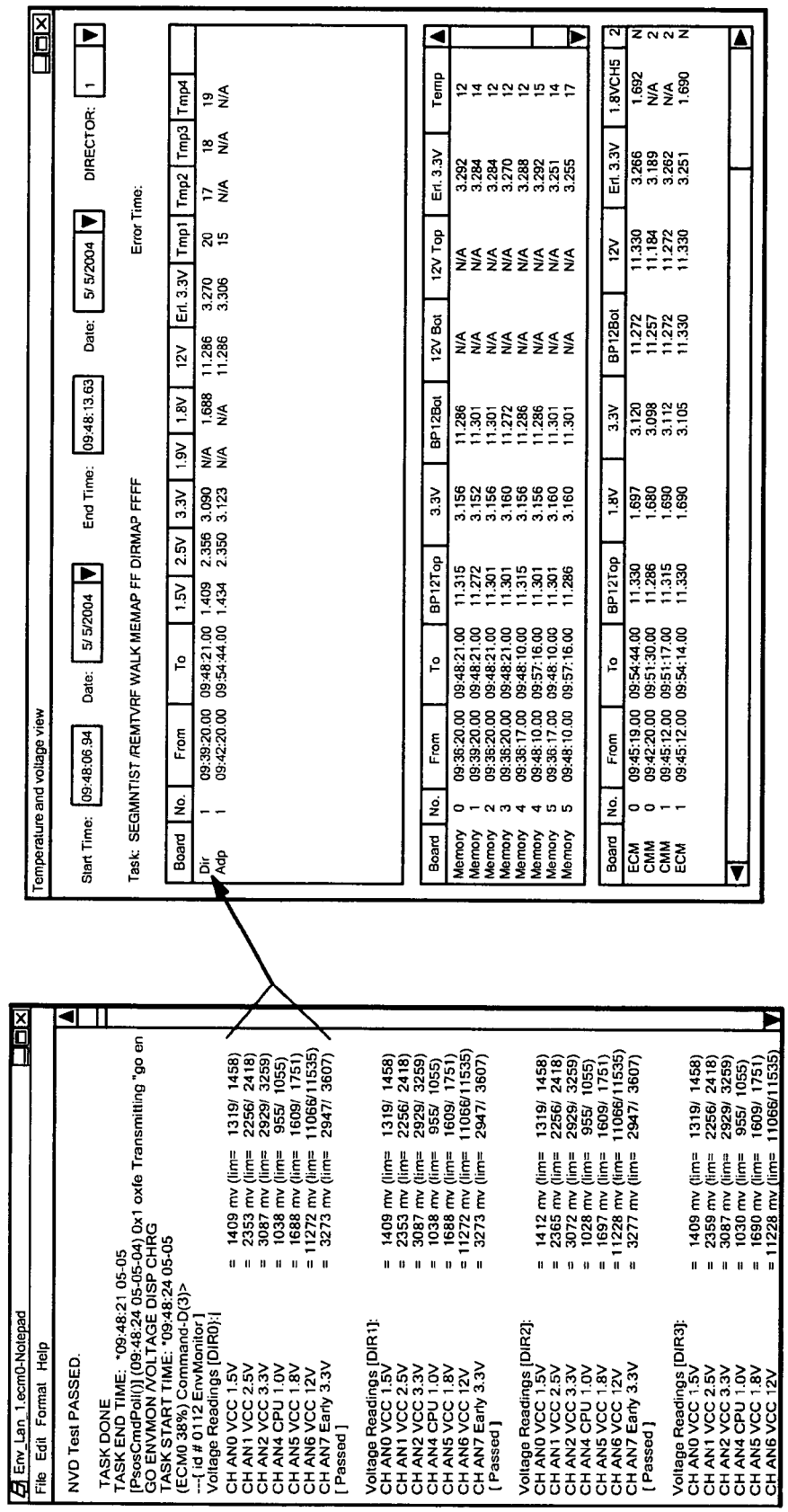

Referring now to FIG. 12, displays are shown which provide to the user information relating to the environmental conditions of the memory, director and the other boards used in the system, e.g., the temperature and voltage when an error or an event occurred on any CPU. Since this data is valid in one place only, every time someone was looking at an error, he had to go to other logs and look for the temperature and voltage readings in this log and correlate them to the failure, based on time stamp. Here, in the PC has an internal database of all environmental reading that were parsed out of the environmental boards logs and its linked to the database of all tests. This way, the user can identify the environmental parameters for each test, even though they are not in the regular logs. What the process does is to look for a time match on the test and the environmental reading. The data is stored in 2 separate data structures, but displayed in one screen of the display.

Figure 13:
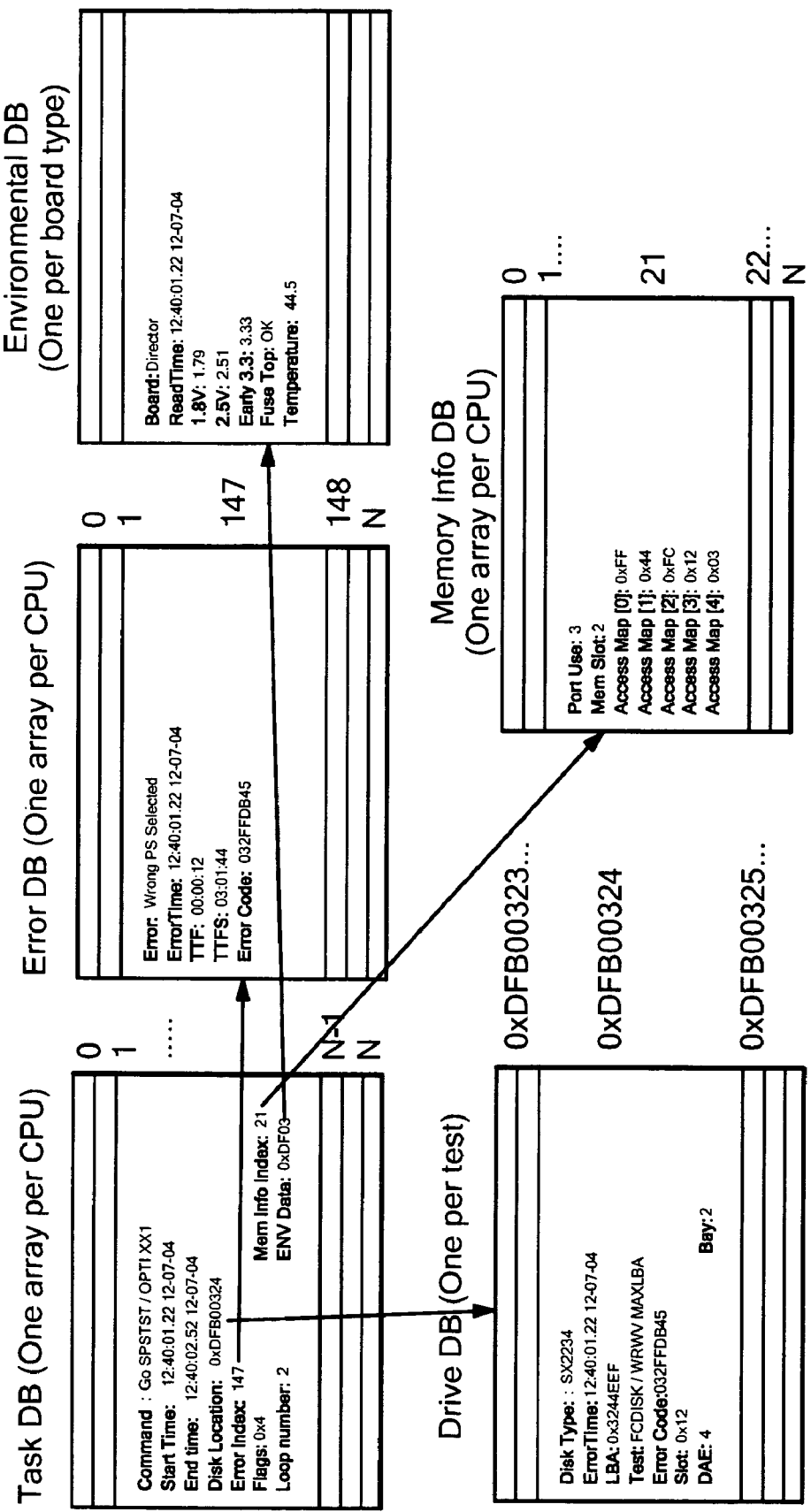

Thus, referring now to FIG. 13, the log file is processed into a set of data structures that are linked together in order to give the user information about everything that happened in the system, without the need to look at the raw log files or to jump between them. The "Task DATA BASE (DB)" is holding the information of each and every test that ran in the system. The information for example is what the test was, how long it took, and where it is located on the disk etc. The "Error DB" contains information regarding errors that were found during the test such as the error description, code etc. The "Environmental DB" contains the environmental readings per time; it includes readings of voltage and temperature per director. The "Memory Info DB" contains information about the memory access per test and stores a map that show what regions on what memories were accessed by the test. The "Drive DB" contains information regarding the disk drives in the system, their physical location and errors they had. Thus, the method takes the information on each memory board from the log files and makes it available for all other internal databases. When a test is executed that accessed global memory, the user is able to identify where it went by looking at the address it was using, and searching for it in the memory information database.

A number of embodiments of the invention have been described. Nevertheless, it will be understood that various modifications may be made without departing from the spirit and scope of the invention. Accordingly, other embodiments are within the scope of the following claims.

What is claimed is:

1. A method for analyzing test data obtained from log files of a data storage system having: a plurality of director printed circuit boards, each one of the director boards having thereon a plurality of CPUs; and a memory printed circuit board, such director printed circuit boards and memory printed circuit board being interconnected through a backplane, each one of the director printed circuit boards and the memory printed circuit board being plugged into a different slot of such backplane, such method comprising:

testing each one of the CPUs on each one of the plurality of director printed circuit boards during a first period of time;

collecting results from such tests in a predetermined format to provide the log files subsequently processing the collected log files to present the results of the tests on a display of a computer in a different format, such different format comprising lines of information on the computer display, each one of the lines of information identifying a corresponding one of the CPUs and indicating whether such corresponding one of the plurality of CPUs passed or failed the testing thereof; and wherein the processing includes presenting the results of the tests as a second set of lines of information on a different view of the computer display during a second period of time subsequent to the first period of time, the second set of lines of information identifying each one of the CPUs and the operating states thereof when the plurality of CPUs were tested and operated during a selected, common, period of time, such common period of time being during the first period of time.

2. A method for analyzing test data obtained from log files of a data storage system having: a plurality of director printed circuit boards, each one of the director boards having thereon a plurality of CPUs; and a memory printed circuit board, such director printed circuit boards and memory printed circuit board being interconnected through a backplane, each one of the director printed circuit boards and the memory printed circuit board being plugged into a different slot of such backplane, such method comprising:

testing each one of the CPUs on each one of the plurality of director printed circuit during a first period of time;

collecting results from such tests in a in a predetermined format to provide the log files, subsequently processing the collected log files to present the results of the tests on a display of a computer in a different format, such different format comprising lines of information on the computer display, each one of the lines of information identifying a corresponding one of the CPUs and indicating whether such corresponding one of the plurality of CPUs passed or failed the testing thereof;

wherein the system includes a environmental printed circuit board interconnected to the plurality of director printed circuit boards and the memory printed circuit board through a backplane, such environmental printed circuit board being plugged into a different slot of such backplane, such environmental printed circuit board, the plurality of director printed circuit boards and the memory printed circuit board having thereon sensors for measuring voltages produced on such printed circuit boards and operating temperatures of such printed circuit boards during a second period of time subsequent to the first period of time, such environmental printed circuit board having thereon circuitry for producing signals representative of the measured voltages and temperatures during the testing, and wherein the processing includes:

presenting the results of the tests on a display of the computer in a different format, such different format comprising lines of information on the computer display, each one of the lines of information identifying a corresponding one of the boards and presenting the temperature and voltages or such corresponding one of the boards during the second period of time.

3. A method for analyzing test data obtained from a log files of a data storage system having: a plurality of director printed circuit boards, each one of the director boards having thereon a plurality of CPUs; and a memory printed circuit board, such director printed circuit boards and memory printed circuit board being interconnected through a backslap, each one of the director printed circuit boards and the memory printed circuit board being plugged into a different slot of such backplane, such method comprising:

testing each one of the CPUs on each one of the plurality of director printed circuit boards during a first period of time;

subsequently processing the collected log files to present processing the collected log files to present the results of the tests on a display of a computer in a different format, such different format comprising a plurality of data structures, each one of such data structures being associated with a corresponding one of the plurality of the CPUs to provide the log files;

subsequently processing the collected data from the plurality of data structures to combine the plurality of data structures into a common, linked data structure;

presenting data in the linked data structure on a display of the computer as lines of information, each one of the lines of information identifying a corresponding one of the CPUs and indicating whether such corresponding one of the CPUs passed or failed the testing thereof during a second period of time subsequent to the first period of time; and wherein the presenting includes a second set of lines of information on a different view of the computer display, the second set of lines of information identifying each one of the CPUs and the operating states thereof when the plurality of CPUs were tested and operated during a selected, common, period of time, such common period of time being during the first period of time.

4. A method for analyzing test data obtained from log files of a data storage system having: a plurality of director printed circuit boards, each one of the director boards having thereon a plurality of CPUs; and a memory printed circuit board, such director printed circuit boards and memory printed circuit board being interconnected through a backplane, each one of the director printed circuit boards and the memory printed circuit board being plugged into a different slot of such backplane, such method comprising:

testing each one of the CPUs on each one of the plurality of director printed circuit boards during a fast period of time;

collecting results from such tests in a predetermined format to provide the log files;

Subsequently processing the collected log files to present processing the collected log files to present the results of the tests on a display of a computer in a different format, such different format comprising a plurality of data structures, each one of such data structures being associated with a corresponding one of the plurality of the CPUs to provide the log files;

subsequently processing the collected data from the plurality of data structures to combine the plurality of data structures into a common, linked data structure; and presenting data in the linked data structure on a display of the computer as lines of information, each one of the lines of information identifying a corresponding one of the CPUs and indicating whether such corresponding one of the CPUs passed or failed the testing thereof during a second period of time subsequent to the first period of time; and wherein the system includes a environmental printed circuit board interconnected to the plurality of director printed circuit boards and the memory printed circuit board through a backplane, such environmental printed circuit board being plugged into a different slot of such backplane, such environmental printed circuit board, the plurality of director printed circuit boards and the memory printed circuit board having thereon sensors for measuring voltages produced on such printed circuit boards and operating temperatures of such printed circuit boards, such environmental printed circuit board having thereon circuitry for producing signals representative of the measured voltages and temperatures during the testing, and wherein each one of the lines of information identifies a corresponding one of the boards and presents the temperature and voltages of such corresponding one of the boards during the second period of time.

\* \* \* \* \*